Jan. 10, 1950     E. MOSTHAF     2,494,447
HEATING GRILL
Filed April 29, 1947
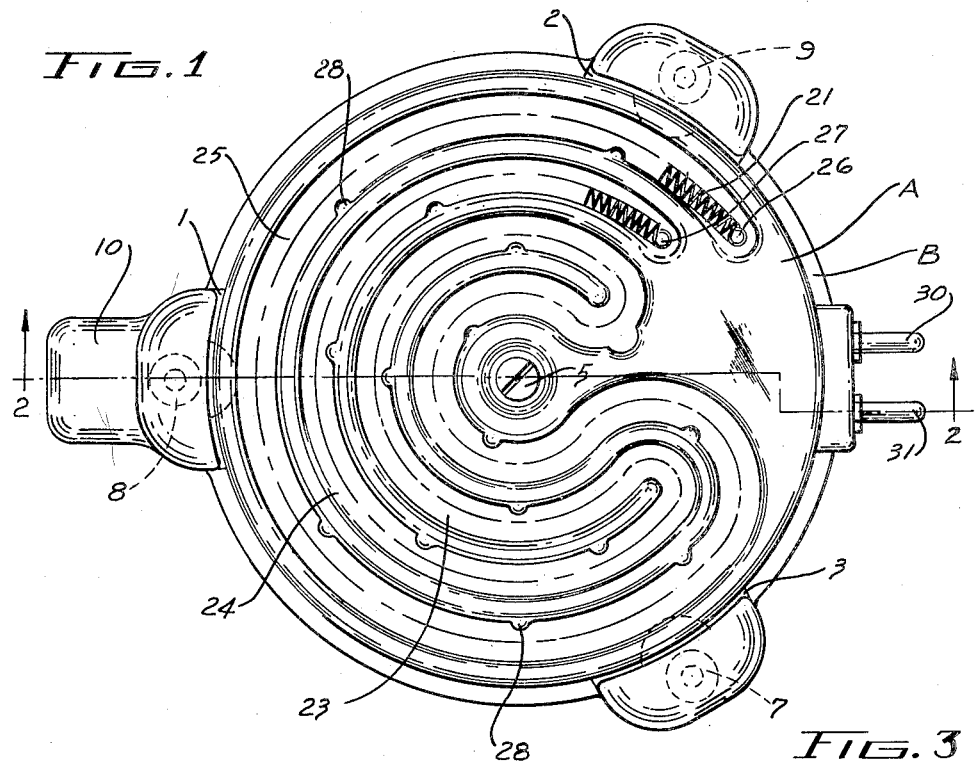
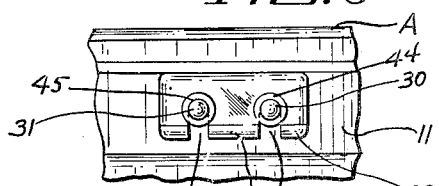
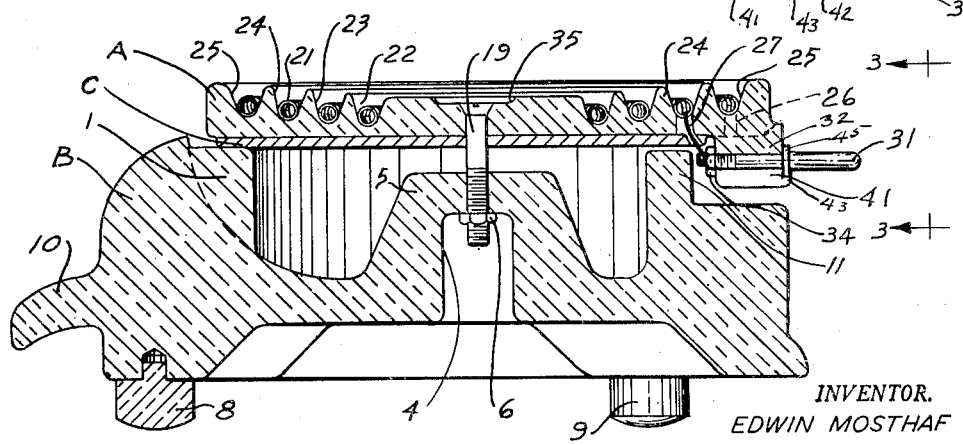
INVENTOR.
EDWIN MOSTHAF
BY
Greene & Durr
ATTORNEYS Patented Jan. 10, 1950

2,494,447

UNITED STATES PATENT OFFICE 2,494,447

HEATING GRILL

Edwin Mosthaf, Orange, N. J., assignor to Steatite Research Corporation, Keasbey, N. J., a corporation of Delaware Application April 29, 1947, Serial No. 744,669

2 Claims. (Cl. 219—37)

This application relates to an electrical heating plate.

An object of this invention is to produce an attractive, easily assembled electrical grill.

Another object of the invention is to produce an electrical grill in which substantially all the nonelectrical parts are made of nonmetallic materials.

Another object of the invention is to produce an electrical grill in which substantially all the nonelectrical parts are made of ceramic materials.

Another object of the invention is to produce an electrical grill which has no exposed metallic parts other than the electrical heating coil.

Another object of the invention is to produce a ceramic base plate for an electric grill having an integral appendage for holding the electrodes for an electrical connecting plug to which the said electrodes are easily attached.

These and other objects ancillary thereto are obtained by making an electrical grill in three parts which comprises a ceramic plate to hold the resistance coil, a base member to support the plate, and a heat insulating part to separate the base and the plate.

The novel features characteristic of this invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a top plan view of the grill.

Figure 2 is a cross-sectional view taken on line 2—2 of Figure 1.

Figure 3 is a detail end view of the switch appendage.

As shown in the drawing, the grill comprises three main parts, the plate A, the base B, and the insulating sheet C. The base B comprises three upstanding portions, 1, 2 and 3, for supporting the insulating material C and the plate A in a nontiltable position. The base is made hollow to reduce its weight and also to provide for cooling of the base. The hollow portion has a raised center portion 5 which is hollowed out from below at 4 to receive the screw 19 by which the plate A is attached to the base. The tension between the plate A and the base B is adjusted by means of the nut 6 on the screw 19. To the bottom of the base B three legs 7, 8 and 9 are attached. The base B also has a handle 10 which is preferably integral with the base. Between the upright portions 2 and 3 of the base a wall 11 extends. This wall 11 protects the electrodes of the plate from being accidentally shorted.

The plate A comprises a maize of channels 22, 23, 24 and 25, for example, which are adapted to hold the heating coil 21 away from the surface of the object being heated. Suitable orifices 26 and 27 extend from the bottom of the channels 24 and 25 through to the bottom of the plate A. These channels permit the ends of the heating coil 21 to extend to the connecting ends 34 (only one is shown) of the electrodes 30 and 31. These electrodes 30 and 31 are fixed in an integral depending portion 32 of the plate A. Since the depending portion 32 is integrally molded with the plate A there is no chafing of the wire connections and no chance of displacement of the plate with respect to the electrodes 30 and 31. At the point in the center of the plate where the screw 19 holds the plate against the base B there is preferably an indented portion 35. After the grill is assembled this indented portion may be filled with ceramic cement, if desired, so that the top of the screw 19 is no longer exposed. The orifice 4 and the base B may also be filled with plastic material. At various points along the channels, nubs 28 are provided to hold the heating coil 21 in place.

For quick assembly of the electrodes 30 and 31 the electrode holder 32 is made with a pair of slots 41 and 42 which are of the same thickness as the electrodes 30 and 31. The holder 32 is also provided with a ledge or flange 43. The electrodes 30 and 31 contain enlarged stud flanges 44 and 45 so that the electrode 31 and its nut 34 can be applied by slipping it into the slot and tightening the nut 34. The ledge 43 then securely holds the electrode since the flange 45 is held against the ledge 43 by the nut 34.

The plate A is made of ceramic material and is preferably glazed to produce a decorative effect.

The plate or sheet C is heat insulating material, such as asbestos board, resin bound fiber glass material, and so forth.

The base B is preferably made of ceramic material and when so made is also glazed. The base B, however, may be made of temperature resisting plastic material such as phenol formaldehyde condensation products, and so forth.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. An electric grill comprising a ceramic heating plate having a plate-like portion with an integral small depending portion, an electrical heating means in the plate-like portion, said depending portion containing a pair of slots therethrough each adapted to receive an electrode with an enlarged flange, a ledge on at least one of the faces of said depending portion through which said slots extend, said ledge extending below the upper part of said slots so that the enlarged flange of said electrode can be held by said ledge.

2. In a device which is adapted to operate by being connected with a supply of electricity by means of a pair of electrodes and which comprises a part made of insulating material, the improvement which comprises an integral offset block of said insulating material, a pair of substantially parallel open slots in said block running substantially perpendicular to two of the faces of said block, each of said slots being adapted to receive an electrode with an enlarged flange, a ledge on at least one of said faces through which the slots extend, said ledge extending below the innermost parts of said slots so that the enlarged flange of said electrode can be held by said ledge.

EDWIN MOSTHAF.

REFERENCES CITED

The following references are of record in the file of this patent:

UNITED STATES PATENTS

| Number | Name | Date |
|---|---|---|
| 962,793 | Smith | June 28, 1910 |
| 1,307,587 | Kuhn et al. | June 24, 1919 |
| 1,472,201 | Woodson | Oct. 30, 1923 |
| 1,490,767 | De F. Curtis | Apr. 15, 1924 |
| 1,697,175 | Forshee | Jan. 1, 1929 |
| 2,003,714 | Johnson | June 4, 1935 |